July 6, 1954  H. A. HECKENDORF  2,682,992
POWER WASHING CREAM SEPARATOR AND
THREADED DRIVE MEMBER THEREFOR
Filed Nov. 2, 1951

INVENTOR.
Howard A. Heckendorf
BY Paul O. Pippel
Atty.

Patented July 6, 1954

2,682,992

UNITED STATES PATENT OFFICE 2,682,992

POWER WASHING CREAM SEPARATOR AND THREADED DRIVE MEMBER THEREFOR

Howard Albert Heckendorf, Chicago, Ill., assignor to International Harvester Company, a corporation of New Jersey Application November 2, 1951, Serial No. 254,493

12 Claims. (Cl. 233—20)

1

This invention relates to a separating bowl of the power washing and flushing type. More specifically, the invention relates to an improved valve arrangement and driving means for regulating the discharge of a washing liquid from the interior of a cream separator bowl.

In the W. H. Harstick Patent 2,504,261, issued April 18, 1950, a power washing cream separator is disclosed. The cream separator shown in this patent consists of a separating bowl having at its outer maximum periphery a plurality of discharge openings. The discharge openings are so positioned as to define a substantially continuous annular opening through which the washing liquid is discharged from the interior of the bowl. Positioned adjacent the substantially continuous opening is a sealing valve arranged to close the opening during high speeds of rotation of the bowl. In order to effect washing of the bowl after the separating operation has been completed it is necessary to completely flush the interior parts of the bowl and this is accomplished by permitting the flushing liquid to discharge from the bowl through the continuous discharge opening. The sealing ring shown in the Harstick patent is of the centrifugally operable type. During high speeds of rotation of the bowl the sealing ring is effective to close the discharge opening and the separating operation may be conducted in a normal manner. During washing, however, it is desired to open the discharge opening instantaneously to permit quick flushing of the liquid through the opening. In the Harstick construction this is accomplished by delivering a large quantity of liquid to the interior of the bowl whereupon the increased load is effective to slow down the operation of the motor which drives the bowl, and this decreased speed of rotation of the bowl permits the sealing ring to retract from the discharge opening to permit the flushing of liquid therethrough.

A separating bowl of the type described above has certain disadvantages. Extremely large quantities of water must be used to slow down the rotating speed of the bowl so that the centrifugally operable sealing ring will open. Also, after the bowl has slowed down and the washing liquid has been discharged, it is again necessary to speed up the rotation of the bowl to the normal separating speed before washing liquid can again be delivered to the separating bowl.

It is a prime object of this invention therefore, to provide an improved power washing separating bowl, the bowl having provisions wherein the discharge opening can be opened to permit the discharge of washing liquid during an extremely high speed operation of the bowl.

Still another object of the invention is to provide a power washing separating bowl having a peripheral discharge opening, the bowl including a sealing shell positioned exteriorly of the bowl, the shell including a resilient sealing member adapted to be moved in an axial direction over the discharge opening of the bowl for closing the same.

Another object is to provide an improved power washing separating bowl, the bowl including an annular shell positioned exteriorly of the bowl and in relative telescoping relation with respect thereto, the shell including a plurality of openings adapted to register with the discharge opening of the bowl, the shell also including a resilient member which may be moved with the shell in an axial direction over the discharge opening of the bowl for sealing the same.

A still further object is to provide a power washing separator having a peripheral discharge opening, the opening being closed by means of a sealing shell which is positioned in relative telescoping relation with respect to the bowl, the sealing shell including means whereby the shell may be moved in an axial direction relative to the bowl for effecting opening of the discharge opening and for closing of the same.

Still another object is to provide an improved separating bowl having a peripheral discharge opening, and a shell telescopingly engaging said bowl for regulating the discharge of washing liquid through the discharge opening, the shell being relatively movable with respect to the bowl in an axial direction by means of a rotatable drive member which engages the bowl shell in threaded relation for moving the shell in an axial direction with respect to the bowl.

A still further object is to provide an improved driving arrangement including a drive member for a power washing separating bowl, the bowl having a shell positioned in relative telescoping relation so that the shell may be moved relative to the bowl in an axial direction, the drive member including a threaded portion in threaded engagement with a portion of the shell and said drive member having an extension engaging a portion of the bowl in thrust relation whereby the bowl and the shell may be moved relative to each other in an axial direction during rotation of the drive member with respect to the bowl and shell.

These and further objects will become more readily apparent from a reading of the specification when taken in connection with the accompanying sheets of drawings.

Figure 1:
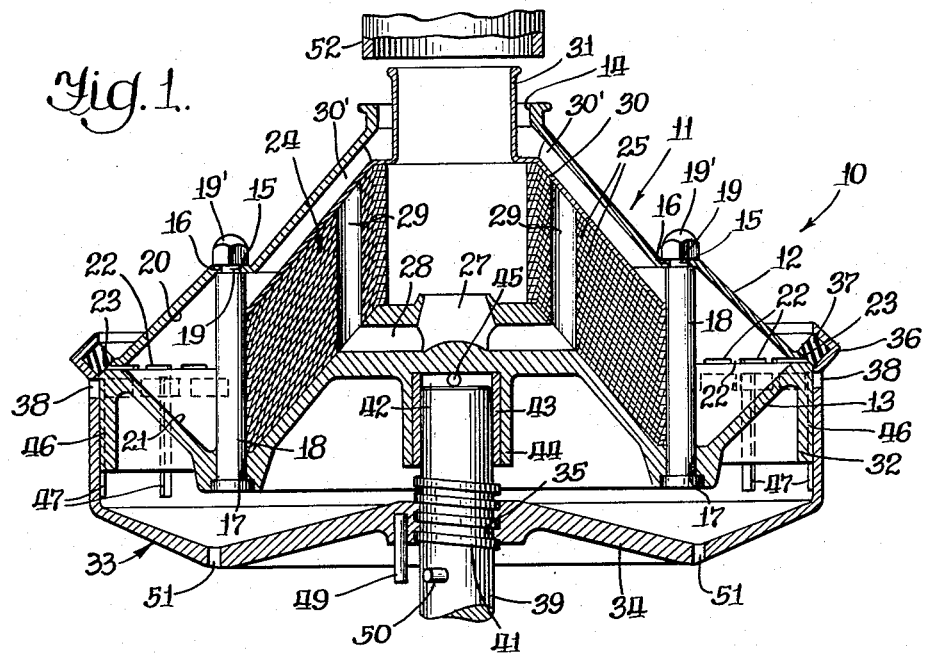
Fig. 1 is a cross-sectional view in elevation through a power washing cream separating bowl illustrating features of the invention in cream separating position.

Referring now to the drawings, a centrifugal separator is generally indicated by the reference character 10. The separator comprises a bowl 11 having an upper bowl shell 12 and a lower bowl shell 13. The upper bowl shell 12 is provided at its upper end with an opening 14. An annular shoulder 15 is provided substantially intermediate the upper and lower ends of the upper bowl shell 12. The annular shoulder 15 includes a plurality of openings 16. The lower bowl shell 13 is provided with a plurality of bores 17 in which pins 18 are positioned. The pins 18 extend vertically and include reduced threaded portions 19 which project through the openings 16. Nuts 19' are threaded over the threaded portions 19 and thus the bowl shells 12 and 13 are securely connected together in assembled relation.

The shells 12 and 13 respectively, include inner annular walls 20 and 21 which slope toward a discharge opening 22 formed at the maximum internal periphery of the bowl 11. The discharge opening 22 consists of a plurality of individual circumferentially spaced openings, but for all practical purposes the discharge opening can be considered as substantially a continuous annular opening being separated only by spacers 22' integrally formed in the shell 12. An annular valve seat or seating surface 23 is provided on an outer portion of the bowl 11. The seating surface 23 is positioned on axially spaced opposite sides of the discharge opening 22.

A disk pack generally designated at 24 is provided within the bowl 11. The disk pack 24 consists of a plurality of superposed separating disks 25, the inner peripheral edges of which define an axially extending substantially cylindrical space. The lower bowl shell 13 is provided with a centrally disposed opening 27 which is in communication with a distributor passage 28, the distributor passage 28 being in communication with a plurality of vertically extending passages 29 formed in the disk pack 24. The upper end of the disk pack 24 is provided with a disk plate 30 which is held in clamping engagement with the disks 25 by means of a plurality of fins 30' which project downwardly from the upper bowl shell 12. The disk plate 30 is provided with a vertically extending collar 31 which projects upwardly through the opening 14 of the upper bowl shell 12.

Figure 2:
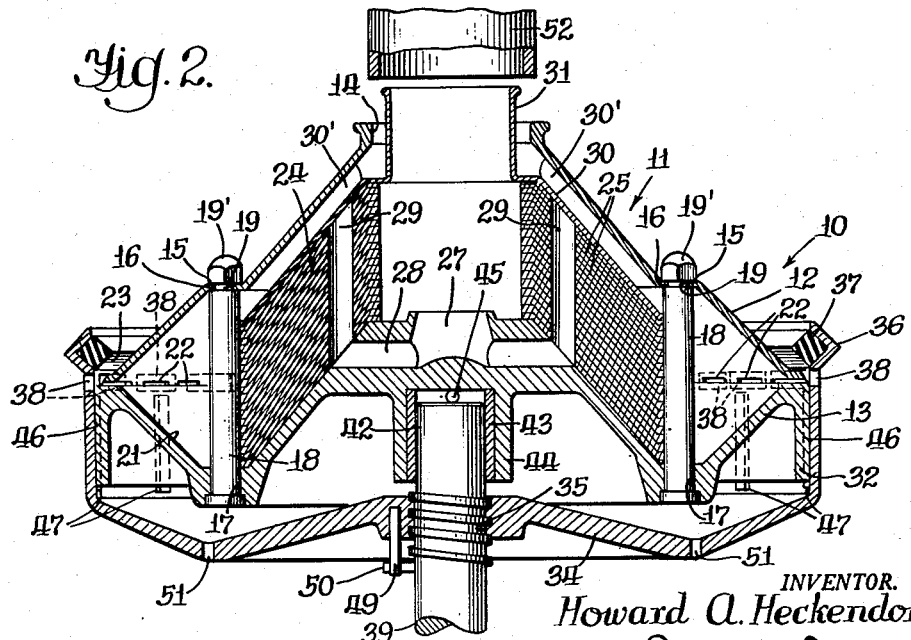
Fig. 2 is a similar view of the bowl in washing position.

The lower bowl shell 13 is provided with an axially and downwardly extending annular skirt 32, the skirt 32 being positioned around the outer periphery of the bowl 11. An annular sealing shell 33 encircles the skirt 32, the sealing shell 33 being relatively movable in an axial or telescoping relation with respect to the skirt 32 and the bowl 11. A central portion 34 of the sealing shell 33 is provided with a threaded bore 35. The upper end of the sealing shell 33 is provided with an annular V-shaped rim which contains an annular sealing valve or element 37, the valve 37 consisting of a rubber-like or resilient material. Immediately below the valve 37 a plurality of circumferentially spaced openings 38 are provided in the sealing shell 33. The openings 38 are adapted to register with the substantially continuous discharge opening 22 during axial movement of the shell 33 as best indicated in Figure 2.

A drive member 39 is suitably connected to a power unit or electric motor (not shown). The drive member 39 includes a threaded or screw portion 41 which is in threaded engagement with the threaded bore 35 in the central shell portion 34. The drive member 39 includes an extension 42 which projects into and is journalled within a bearing 43 contained within a projecting collar 44 of the lower shell 13. A thrust bearing 45 is positioned between the upper end of the extension 42 and the lower bowl shell 13.

The sealing shell 33 is axially movable with respect to the bowl 11 but is keyed against relative rotation by means of a plurality of key ways or recesses 46 formed in the skirt 32. Splines or keys 47 are provided on the sealing shell 33, these splines 47 engaging the recesses or key ways 46. Thus, the sealing shell 33 may be axially moved with respect to the bowl 11 but is keyed against relative rotation.

The drive shaft 39 is positioned to rotate with respect to the bowl 11 and the sealing shell 33. The relative rotation of the shaft 39 with respect to the bowl 11 and the sealing shell 33 is limited by means of a pin 49 which is positioned on the shell 33 and is adapted to be engaged by a pin 50 projecting outwardly from the drive member 39. The shell 33 is also provided with a plurality of drain openings 51 which permit drainage of any liquids which might enter into the space formed between the bowl 11 and the sealing shell 33.

The separating operation of the separator 10 is conventional. The drive member 39 is effective to rotate the bowl 11 at an extremely high speed in a clockwise direction. Material to be separated is delivered through the opening 27 to the distributor 28 by a conventional milk delivery tube which is not shown. The heavier constituents of material, such as skim milk travel to the outer portion of the separating bowl and eventually are discharged through the opening 14. The lighter constituents, such as cream, travel upwardly along the sides of the collar 31 and are discharged from the upper edge of this collar. Suitable tinware (not shown) is arranged for receiving the skim milk and the cream in a conventional manner. After the separating operation has been completed the bowl is now ready for washing. This operation is accomplished in this separator without the need of separating any of the parts of the bowl.

A washing liquid delivery tube 52 is adapted to deliver washing liquid through the opening 14 and downwardly through the collar 31 so that washing liquid is delivered to all of the interior parts of the bowl. Assuming for the moment that the discharge opening is uncovered as shown in Figure 2, upon starting of the motor (not shown), the drive member 39 is rotated. The threaded portion 41 has a left hand thread. As the drive member 39 is rotated in a clockwise direction by the motor, the bowl shell 33 is screwed downwardly on the screw portion 41 to the position shown in Figure 1. The extension 42 of the drive member 39 is in thrust engagement with the thrust bearing 45 and thus during downward movement of the sealing shell 33 the bowl 11 remains in a relatively stationary axial position with respect to the drive member 39. Continued rotation of the drive member 39, and the screw portion 41, causes the bowl shell 33 to be moved into the position shown in Figure 1 whereupon the sealing element or annular valve 37 is in tight sealing relation with respect to the valve seat 23. Thus the sealing element 37 is positioned over the substantially continuous discharge opening 22 and the interior of the bowl is sealed against the discharge of liquids.

Since the bowl is in a non-rotating state when the electric motor is started, the inertia of the bowl shell quickly causes the drive member 39 to screw the bowl 11 and the sealing shell 33 apart in the manner shown in Figure 1 in a very quick manner. Thus the opening 22 is sealed and continued rotation of the drive member 39 results in bringing up the bowl 11 to a high operating speed. The bowl shell 33 and bowl 11 rotate in unison since they are keyed against relative rotation by means of the splines 47. When the bowl has reached a high operating speed of rotation washing liquid can be delivered to the bowl through the spout 52 whereupon the washing liquid is delivered to all the inner parts of the bowl 11.

After a relatively short period of rotation it is desired to discharge the washing liquid through the substantially continuous discharge opening 22. In order to effect discharge of this washing liquid it is merely necessary to momentarily reverse or brake the power to the motor or to the drive member 39. This momentary slowing down of the drive member 39 causes relative rotation of the bowl shell 11 and the sealing shell 33 with respect to the drive member 39. Due to the momentum of the rotating bowl shell 11 and the sealing shell 33, the sealing shell and bowl rotate faster than the shaft 39, which has decelerated, and the shell 33 is screwed upwardly on the threaded portion 41 to the position shown in Figure 2. As indicated in Figure 2, when this happens the sealing valve 37 has been axially displaced from the seating surface 23 and the substantially continuous opening 22 is in registering alinement with the openings 38 whereupon the liquid can flush outwardly through the openings and thus be discharged from the bowl. This action, therefore, provides the quick flushing action which is necessary to completely clean the interior parts of the bowl. As indicated in Figure 2, when the bowl has been moved to its open position relative to the sealing shell 33, the pin 50 engages the pin 49 to prevent any further relative rotation between the drive member 39 and the bowl 11 and sealing shell 33.

Thus, it can be seen that the separating bowl 11 may be rotated at a continued high speed and washing liquid may be discharged by merely momentarily decelerating the drive member 39 which is effective to screw the sealing shell 33 and the bowl in an axial direction toward one another whereupon the sealing valve 37 is displaced and the liquid can be discharged through openings 22 and 38. After the liquid has thus been discharged it is a simple matter to again accelerate the drive member 39 whereupon the drive member 39 again moves relative with respect to the bowl 11 and the shell 33 tending to screw them apart so that the sealing member 37 is again drawn tightly into engagement over the discharge opening 22. The extension 42 is in thrust engagement with the thrust bearing 45 and also is suitably journalled in the bearing 43.

The pins 49 and 50 are effective to limit the relative rotation of the drive member 39 with respect to the shell 33 and the bowl 11 since only a limited axial movement of the parts is required to place them in the positions shown in Figures 1 and 2. The relative movement apart of the sealing shell 33 with respect to the bowl 11 is limited by means of the sealing member or valve 37 and its engagement with the seating surface 23. The relative movement toward one another of the bowl 11 and shell 33 is limited by means of the pins 49 and 50. Thus as the limiting portions take effect in limiting the relative axial movement of the bowl 11 and the shell 33 the continued rotation of the drive member 39 is effective to impart rotation to the separating bowl 10.

It can now be seen that the objects of the invention have been fully achieved and a bowl construction has been disclosed that can be rotated at a continued high speed of operation, liquid being discharged from the bowl during the high speed of operation without materially changing its speed by simply decelerating the drive member. It must be understood that changes and modifications may be made without departing from the spirit of the invention as disclosed nor the scope thereof as defined in the appended claims.

What is claimed is:

1. A power washing separator comprising a separating bowl having a plurality of first peripheral discharge openings and an axially disposed opening for directing liquids to be separated and washing liquids to the interior of said bowl, a plurality of separating disks within the bowl, an annular skirt connected to the outer periphery of said bowl and extending axially with respect thereto, an annular sealing shell encircling said annular skirt, said shell being relatively movable in an axial direction with respect to said bowl, said shell having an axially extending centrally disposed threaded bore, means between said sealing shell and said skirt to lock said shell and bowl with respect to relative rotation, said shell including a plurality of second discharge openings positioned adjacent to the first discharge openings and being adapted to register therewith during relative axial movement between the bowl and the shell to a first position for discharging liquid from the bowl, an annular resilient sealing element connected to said shell, said sealing element being axially movable with said shell to a second position over the first peripheral discharge openings for sealing said first openings, means for moving said shell in an axial direction to the first and second positions including a drive rotatable member having a threaded portion in engagement with the threaded bore, an extension on said rotatable drive member projecting from the shell toward said bowl, a thrust bearing on said bowl, said thrust bearing being engaged by said extension, the bowl and shell being relatively movable axially to the first and second positions during relative rotation of the shell and bowl with respect to said drive member, and means for limiting the relative rotation between said shaft and the bowl whereby rotation of said drive member imparts rotation to said bowl and shell.

2. A power washing separator comprising a separating bowl having a plurality of peripheral discharge openings and an axially disposed opening for directing liquids to be separated and washing liquids to the interior of said bowl, a plurality of separating disks within the bowl, an annular skirt connected to the outer periphery of said bowl and extending axially with respect thereto, an annular sealing shell encircling said annular skirt, said shell being relatively movable in an axial direction with respect to said bowl, said shell having an axially extending centrally disposed threaded bore, means between said sealing shell and said skirt to lock said shell and bowl with respect to relative rotation, an annular resilient sealing element connected to said shell, said sealing element being axially movable with said shell to a position over the peripheral discharge openings for sealing said openings, means for moving said shell in an axial direction to close said discharge openings including a rotatable member having a threaded portion in engagement with the threaded bore, an extension on said rotatable member projecting from the shell toward said bowl, a thrust bearing on said bowl, said thrust bearing being engaged by said extension, the bowl and shell being relatively movable axially during relative rotation of the shell and bowl with respect to said rotatable member, and means for limiting the relative rotation between said shaft and the bowl whereby rotation of said rotatable member imparts rotation to said bowl and shell.

3. A power washing separator comprising a separating bowl having a plurality of peripheral discharge openings and an axially disposed opening for directing liquids to be separated and washing liquids to the interior of said bowl, a plurality of separating disks within the bowl, an annular skirt connected to the outer periphery of said bowl and extending axially with respect thereto, an annular sealing shell encircling said annular skirt, said shell being relatively movable in an axial direction with respect to said bowl, said shell having an axially extending centrally disposed threaded bore, means between said sealing shell and said skirt to lock said shell and bowl with respect to relative rotation, an annular resilient sealing element connected to said shell, said sealing element being axially movable with said shell to a position over the peripheral discharge openings for sealing said openings, means for moving said shell in an axial direction to close said discharge openings including a rotatable member having a threaded portion in engagement with the threaded bore, an extension on said rotatable member projecting from the shell toward said bowl, and a thrust bearing on said bowl, said thrust bearing being engaged by said extension, the bowl and shell being relatively movable axially during relative rotation of the shell and bowl with respect to said rotatable member.

4. A power washing separating bowl having a peripheral discharge opening, a plurality of separating disks within said bowl, an annular sealing shell encircling said bowl, said shell being relatively movable in an axial direction with respect to said bowl, said shell having a substantially centrally disposed axially extending threaded bore, means connecting said shell for rotation with said bowl, said shell including a discharge opening movable into registry with the peripheral discharge opening of the bowl upon movement of the shell to a first position, a sealing element on said shell, said sealing element being movable with said shell to seal said peripheral discharge opening upon movement of said shell to a second position, means for moving said shell axially to the first and second positions, said means including a rotatable member having a threaded portion in engagement with the threaded bore of the shell, said rotatable member having an extension in engagement with the bowl, said bowl and shell being relatively axially movable during relative rotation of the rotatable member with respect to said shell and bowl, and means for limiting the relative rotation of the rotatable member with respect to the shell and bowl whereby continued rotation of said rotatable member is imparted to said shell and bowl.

5. A power washing separating bowl in accordance with claim 4, said bowl including a centrally disposed thrust bearing which is engaged by the extension of said rotatable member.

6. A power washing separating bowl comprising a peripheral discharge opening, a sealing shell encircling said bowl, said bowl and shell being relatively movable in axial direction toward and away from each other, a valve seating surface on the exterior of said bowl adjacent said peripheral discharge opening, a resilient valve element on said shell adapted to be moved with said shell into a first position in engagement with the seating surface for sealing the peripheral discharge opening, said shell including an opening adapted to be moved to a second position in registry with the peripheral discharge opening for discharging liquids from the bowl and means rotatable drive connected to said shell and to said bowl for moving the bowl and shell axially to the first and second positions.

7. A power washing separating bowl in accordance with claim 6, the means for moving the bowl and shell to the first and second position comprising a rotatable screw in threaded engagement with the shell, and a portion on said screw engaging the bowl in thrust relation, whereupon relative rotation between said screw and said bowl and shell, said shell is moved relative to said bowl axially to the first and second positions.

8. A power washing separating bowl in accordance with claim 7, including means for limiting the relative axial movement of the bowl and shell whereupon continued rotation of the screw imparts rotating movement to the bowl.

9. A power washing separator comprising a separating bowl having a peripheral discharge opening, a sealing shell encircling said bowl, said shell having a discharge opening adapted to be moved in registry with said peripheral discharge opening during axial movement of the shell relative to said bowl during one position, said shell being movable axially to a second position with respect to the bowl for covering and sealing the discharge opening, means for moving the shell axially relative to the bowl comprising a rotatable screw in threaded engagement with said sealing shell and in engagement with the bowl, whereupon rotation of said screw relative to said bowl during overrunning of said bowl with respect to said rotatable screw, said shell is moved axially relative to said bowl.

10. A power washing separating bowl in accordance with claim 9, said bowl and shell including keying means for locking said shell to said bowl with respect to relative rotation.

11. A power washing separating bowl in accordance with claim 10 including means for limiting the relative rotation of said screw with respect to said shell whereupon continued rotation said bowl is rotated.

12. A power washing separating bowl comprising a peripheral discharge opening, a sealing shell encircling said bowl, said bowl and shell being relatively movable in axial direction toward and away from each other, a valve seating surface on the exterior of said bowl adjacent said peripheral discharge opening, a resilient valve element on said shell adapted to be moved with said shell into a position in engagement with the seating surface for sealing the peripheral discharge opening, the shell being movable to a second position wherein the peripheral discharge opening is open for the discharge of material therethrough, means for moving said shell axially relative to said bowl for sealing the peripheral discharge opening, said means including a rotatable member having a threaded portion in threaded engagement with the shell, an extension on said rotatable member, said extension being in engagement with said bowl whereupon during relative rotation between said rotatable member and said shell and bowl said shell is moved axially relative to said bowl.

References Cited in the file of this patent

UNITED STATES PATENTS

| Number | Name | Date |
| --- | --- | --- |
| 1,815,409 | Knuttel | July 21, 1931 |
| 2,178,547 | Bjornstjerna | Nov. 7, 1939 |